(12) United States Patent
Paliwoda

(10) Patent No.: US 11,488,632 B2
(45) Date of Patent: Nov. 1, 2022

(54) TAP TO ADVANCE BY SUBTITLES

(71) Applicant: Snap Inc., Santa Monica, CA (US)

(72) Inventor: David Paliwoda, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/327,907

(22) Filed: May 24, 2021

(65) Prior Publication Data

US 2021/0280218 A1    Sep. 9, 2021

Related U.S. Application Data

(63) Continuation of application No. 16/662,937, filed on Oct. 24, 2019, now Pat. No. 11,043,244.

(60) Provisional application No. 62/879,968, filed on Jul. 29, 2019.

(51) Int. Cl.
| | | |
|---|---|---|
| *G11B 27/00* | (2006.01) | |
| *G11B 27/34* | (2006.01) | |
| *G06F 3/04883* | (2022.01) | |

(52) U.S. Cl.
CPC ........ *G11B 27/005* (2013.01); *G06F 3/04883* (2013.01); *G11B 27/34* (2013.01)

(58) Field of Classification Search
CPC .... G11B 27/005; G11B 27/34; G06F 3/04883
See application file for complete search history.

(56) References Cited

U.S. PATENT DOCUMENTS

| | | |
|---|---|---|
| 6,553,180 B1 | 4/2003 | Kikuchi et al. |
| 2009/0259633 A1 | 10/2009 | Bronstein et al. |
| 2013/0110601 A1 | 5/2013 | Sugiura et al. |
| 2019/0158928 A1 | 5/2019 | Yoo |

OTHER PUBLICATIONS

"U.S. Appl. No. 16/662,937, Final Office Action dated Dec. 10, 2020", 12 pgs.
"U.S. Appl. No. 16/662,937, Non Final Office Action dated Jul. 24, 2020", 10 pgs.
"U.S. Appl. No. 16/662,937, Notice of Allowance dated Feb. 22, 2021", 10 pgs.
"U.S. Appl. No. 16/662,937, Response filed Feb. 4, 2021 to Final Office Action dated Dec. 10, 2020", 10 pgs.
"U.S. Appl. No. 16/662,937, Response filed Oct. 12, 2020 to Non Final Office Action dated Jul. 24, 2020", 9 pgs.

*Primary Examiner* — Mishawn N. Hunter
(74) *Attorney, Agent, or Firm* — Schwegman Lundberg & Woessner, P.A.

(57) ABSTRACT

Systems and methods are provided for advancing through video content. The systems and methods include generating playback of a video associated with subtitles comprising a sequence of subtitle segments; receiving a user request to advance playback of the video from a first video play position corresponding to a first subtitle segment of the sequence of subtitle segments; identifying a second subtitle segment of the sequence of subtitle segments that is adjacent to the first subtitle segment in the sequence of subtitle segments; and in response to receiving the user request to advance playback of the video, advancing playback of the video from the first video play position to a second video play position based on a subtitle segment play position associated with the second subtitle segment.

20 Claims, 9 Drawing Sheets

TAP TO ADVANCE BY SUBTITLES

CLAIM FOR PRIORITY

This application is a continuation of U.S. application Ser. No. 16/662,937, filed Oct. 24, 2019, which claims the benefit of priority to U.S. Provisional Application No. 62/879,968, filed Jul. 29, 2019, which are herein incorporated by reference in their entireties.

TECHNICAL FIELD

The present disclosure relates generally to advancing playback of videos.

BACKGROUND

Modern day user devices are used by users to consume videos throughout the day. Often users consume such videos without audio to avoid disrupting other people in their surroundings. In such cases, the videos are consumed with subtitles to enhance the user experience.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
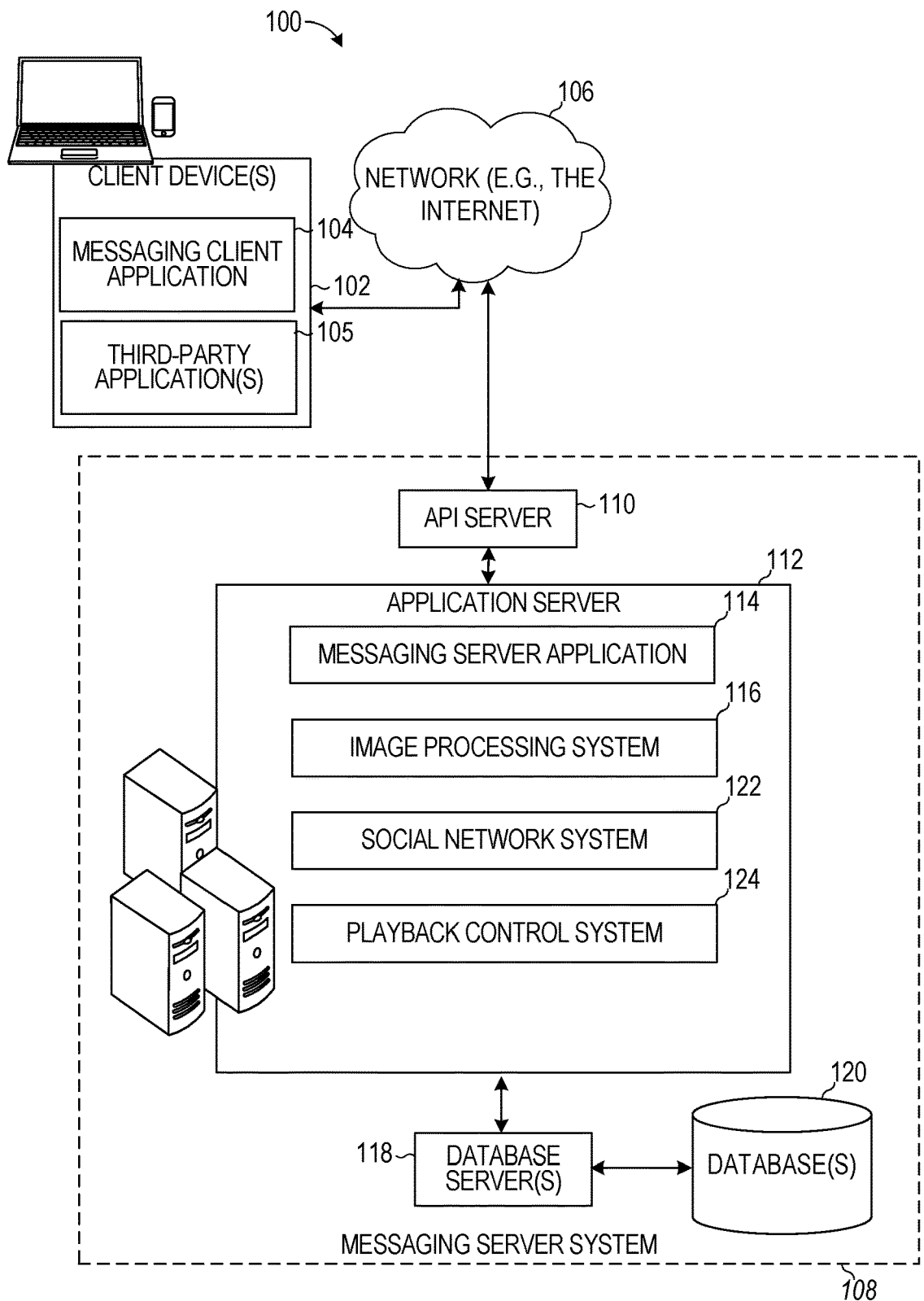
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on their mobile device. Users typically advance through various videos or segments within the videos by performing some action or gesture (e.g., tapping on the screen). The points to which the users advance when performing such actions or gestures are predetermined by the content creator. For example, users can advance through each show or story, which can range from 4 to 20 seconds, by tapping on the screen. Sometimes, though, users would like to simply skip over some non-dialogue portion of the content rather than skipping over the content entirely. To do so, a user has to call up a transport bar and manually drag a position indicator to a desired play position in the video. Even still, the user is left to guess how far ahead to advance the position indicator to skip over the non-dialogue portion of the content. Some applications provide for skipping forward or back a set interval by a sequence of taps on the left- or right side of a mobile device touchscreen (e.g., 15 seconds for a double-tap, 30 seconds for a triple tap, 1 minute of a quadruple tap, etc.). Usually the user ends up skipping too far ahead or not far enough and wastes a great deal of time and effort trying to seek to a particular play position in the video. This ends up frustrating users and detracts from the overall enjoyment and experience of the video being consumed.

The disclosed embodiments improve the efficiency of using the electronic device by providing a playback control system that provides users with an efficient and easy-to-use interface for advancing through content, such as a video, based on subtitles associated with the video. Specifically, according to the disclosed embodiments, a simple and straight-forward user interface is provided that allows a given user to advance through non-dialogue portions of a video while viewing dialogue-heavy video on mute or low volume by performing a given gesture (e.g., by tapping on the screen on which the video is displayed or shaking the device). As an example, if dialogue is spoken more slowly than a user can read in the subtitles, such as in a news program, a user can skip from one fragment of subtitles to the next as quickly as the user reads the subtitle fragment currently being presented by performing a given gesture. In this way, the user can quickly skip from one fragment of subtitles to the next, allowing consumption of the video at a much faster pace without skipping past any subtitle fragments.

Specifically, in response to detecting the given gesture, the disclosed embodiments determine the relative amount of time between the current video play position in the video and a subtitle segment play position of the next subtitle segment. The disclosed embodiments retrieve the next subtitle segment that is to be presented after the currently displayed subtitle segment and obtain the subtitle segment play position of the retrieved next subtitle segment. If the difference between the current video play position and the subtitle segment play position exceeds a threshold (e.g., 10 seconds), then playback of the video automatically advances by a specified amount (e.g., an amount equal to the threshold), to a next break point, chapter, or advertisement. If the difference between the current video play position and the subtitle segment play position is less than the threshold (e.g., 10 seconds), then playback of the video automatically advances to the subtitle play position.

In some cases, the user can quickly advance through playback of the video and read the corresponding subtitles without missing any context or subtitles. Namely, the user can simply keep tapping to view and read all the subtitle segments of the video, where the next subtitle segments are continuously retrieved and displayed each time the user taps on the screen or performs some other suitable gesture.

In this way, the disclosed embodiments improve the efficiency of using the electronic device by reducing complexity a user experiences in advancing playback of a video, and particularly skipping over non-dialogue portions of the video or accessing the next subtitle segment as soon as the user finishes reading the current subtitle segment being presented, and by reducing the number of screens and interfaces a user has to navigate through to skip to a desired portion of the video. This reduces the device resources (e.g., processor cycles, memory, and power usage) needed to accomplish a task with the device.

Although subtitles and closed-captions (CC) may include different content, the term "subtitles" or "subtitle segment" used in this disclosure applies equally to both. Specifically, subtitles provide a text alternative for dialogue of video footage—the spoken words of characters, narrators, and other vocal participants—while CC not only supplements dialogue like subtitles, but also includes other relevant parts of the soundtrack describing background noises, phones ringing, and other audio cues that need to be described. In some cases, subtitles provide the textual transcription of the audio track corresponding to a video. The subtitles of the corresponding video are arranged in a sequence of subtitle fragments, segments, parts, and/or subunits, where each subtitle fragment, segment, part, and/or subunit includes one or more words to be presented together on-screen simultaneously as collective text. Each subtitle fragment, segment, part, and/or subunit is associated with a corresponding play position of the video at which the one or more words of the subtitle fragment, segment, part, and/or subunit is presented.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a playback control system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

In some embodiments, the messaging client application 104 may present a user with a video discovery graphical user interface. The video discovery graphical user interface may display one or more interactive representations (e.g., icons or thumbnails) that identify respective videos. The messaging client application 104 receives a user selection of a first one of the interactive representations. In response to receiving the user selection, the messaging client application 104 retrieves a first video that corresponds to the selected interactive representation and plays back or displays the video. In some cases, the first video may include a sequence of one or more video clips (e.g., 10 second video clips). The user can advance between each video clip in the video by tapping (physically touching for less than a threshold period of time (e.g., 1 second)) on the screen. In response to the user tapping on the screen, the messaging client application 104 retrieves a next video clip in the sequence. Once all of the video clips or once the first video is completely played back, a second video may be selected (e.g., by the user manually selecting a particular interactive representation or automatically by selecting a video that matches user interests). The second video may be played back and presented to the user.

In some embodiments, the messaging client application 104 provides a user with a graphical user interface that allows the user to select an option to selectively enable advancing playback based on subtitle segments. In response to determining that this option has been enabled (in some cases the option is enabled by default), the messaging client application 104 may advance playback of a video when the user taps on the screen based on subtitle segment play positions. Specifically, rather than retrieving the next video clip in a video clip sequence, the messaging client application 104 bases the playback position to which playback is advanced on the subtitle segments.

For example, the messaging client application 104 may present a video to a user with or without subtitles. During playback, when the video is played back at a first video playback position, the messaging client application 104 may receive a user request (e.g., tapping on the screen) to advance playback of the video. In response, the messaging client application 104 retrieves an index representing a first subtitle segment in a sequence of subtitle segments that correspond to the current video play position. The messaging client application 104 may increment the index by one to access a second subtitle segment that is next in the sequence and adjacent to the first subtitle segment that corresponds to the current video play position. The messaging client application 104 may retrieve the subtitle segment play position of the second subtitle segment (e.g., the starting time to display the subtitle segment). The messaging client application 104 may compute a difference between the current video play position (e.g., the video playback position that was being displayed when the gesture was received from the user) and the subtitle segment play position. The messaging client application 104 may either advance playback automatically to the subtitle segment play position or by a specified amount or to a break or advertisement in the video based on the computed difference.

In some implementations, the messaging client application 104 may compare the computed difference to a threshold. In response to determining that the difference is less than the threshold, the messaging client application 104 may automatically advance playback of the video to the subtitle segment play position as a result of the user tapping on the screen. In response to determining that the difference is equal to or greater than the threshold (e.g., the amount of time between the current video play position and the next subtitle segment—the non-dialogue portion of the video—exceeds the threshold), the messaging client application 104 may automatically advance playback of the video by a specified amount, to a break point, to the next scene, or to an advertisement.

As an example, the video may be played back at video play position 3:50 (minutes:seconds). At this time, the user may tap on the screen. In response, the messaging client application 104 retrieves the subtitles for the video and access the next subtitle segment to be presented after the subtitle segment corresponding to the current video play position. The messaging client application 104 may determine that the subtitle segment play position of the next subtitle segment has a start time of 4:20 (minutes:seconds). The messaging client application 104 may compute a difference between the video play position at which the video is being played back (3:50) and the subtitle segment play position (4:20) of the next subtitle segment. This difference may be approximately equal to 30 seconds. The messaging client application 104 may retrieve a predetermined threshold or user specified threshold or threshold associating with the type of video being played back. The messaging client application 104 may compare the retrieved threshold (e.g., 10 seconds) with the computed difference (30 seconds) and determine that the difference exceeds the threshold. In response, the messaging client application 104 may automatically advance playback of the video by a specified amount (e.g., 10 seconds) and resume playing back the video from a second video play position (e.g., 4:00 (minutes:seconds)).

At a later time, the messaging client application 104 may receive another gesture (e.g., the user may tap on the screen again) this time when the video is at a third play position 5:30 (minutes:seconds). In response, the messaging client application 104 retrieves the subtitles for the video and accesses the next subtitle segment to be presented after the subtitle segment corresponding to the current video play position. The messaging client application 104 may determine that the subtitle segment play position of the next subtitle segment has a start time of 5:35 (minutes:seconds). The messaging client application 104 may compute a difference between the video play position at which the video is being played back (5:30) and the subtitle segment play position (5:35) of the next subtitle segment. This difference may be approximately equal to 5 seconds. The messaging client application 104 may compare the retrieved threshold (e.g., 10 seconds) with the computed difference (5 seconds) and determine that the difference is less than the threshold. In response, the messaging client application 104 may automatically advance playback of the video to the subtitle segment play position (5:35) and resume playing back the video from a second video play position (e.g., 5:35 (minutes:seconds)).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the playback control system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the playback control system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The playback control system 124 allows users selectively enable advancing video playback based on subtitle segments. In some cases, the playback control system 124 presents a graphical user interface that allows a user to specify a particular gesture or action that results in advancing a video based on subtitle segments (e.g., based on a difference between the current video play position and the subtitle segment play position of the next subtitle segment). In some cases, the playback control system 124 is set by default to perform the advance by subtitle segments function in response to receiving a user tap on the screen of the user device. In some cases, the user can configure the playback control system 124 to advance between video clips or designated play points when performing a first gesture (e.g., a tap on the screen) and to advance playback based on subtitle segments when performing a second gesture (e.g., shaking the device from side to side or up and down).

The playback control system 124 is configured to automatically retrieve a subtitle segment play position of a next subtitle segment when the user performs an action to advance by subtitle segments. Based on a difference between the subtitle segment play position and the current video play position, the playback control system 124 advances playback automatically to the subtitle segment play position of the next subtitle segment or to a designated break point or by a specified amount.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
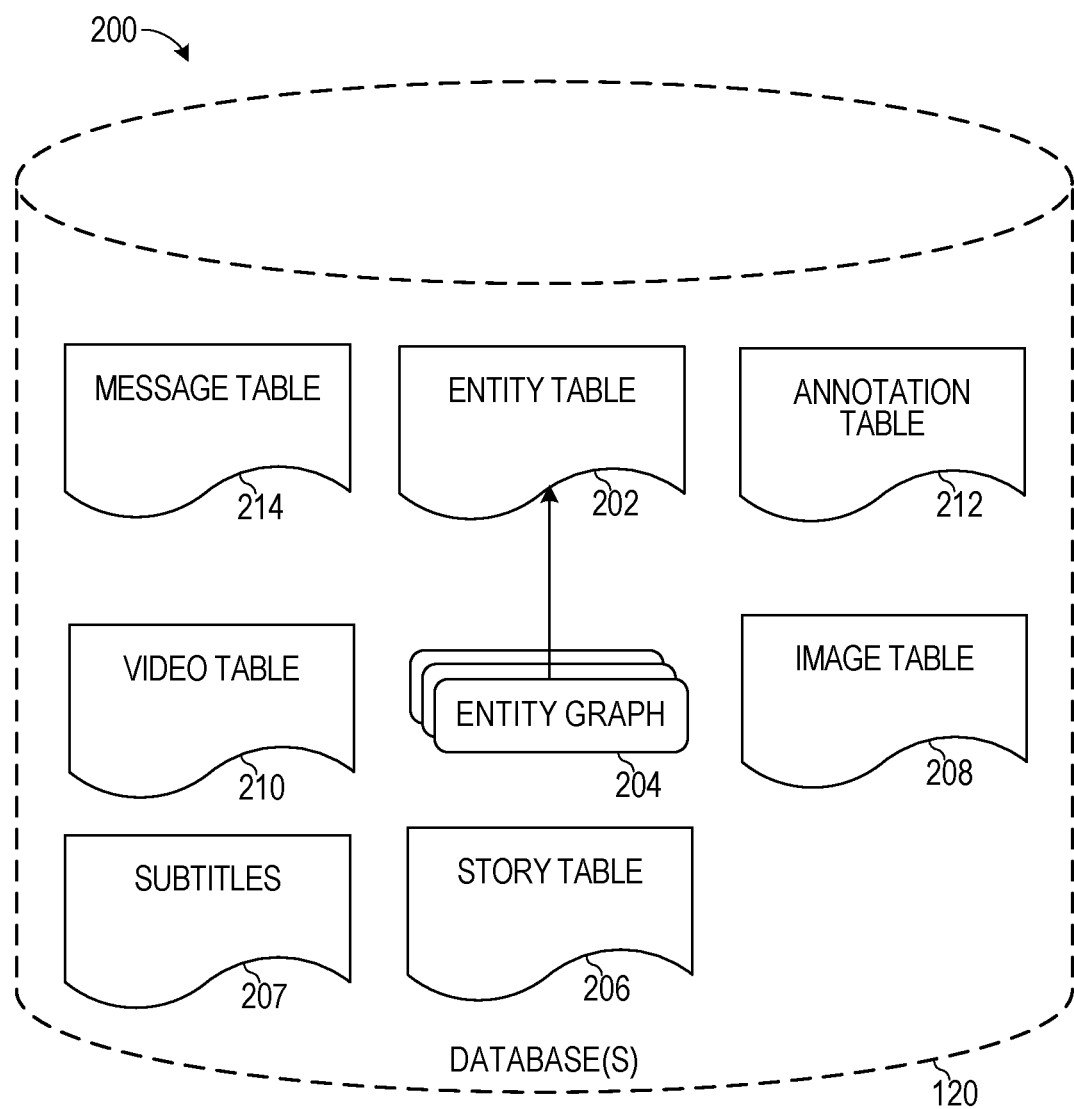
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Subtitles 207 stores subtitle segments for one or more videos available for consumption by the messaging client application 104. Namely, subtitles 207 stores a subtitles file (e.g., an SRT and/or VTT file) and a link to the associated video for the subtitles file. In some implementations, subtitles that are received for a given video are stored in two formats (e.g., SRT and VTT). Specifically, in response to a given user uploading a subtitles file in a first format (e.g., an SRT file), the subtitles file in the first format is stored in association with the corresponding video. Also, the subtitles file in the first format is automatically converted to a subtitles file in a second format (e.g., a VTT file) and also stored in association with the video in the second format. A given request for subtitles for a given video may specify the type of device on which the subtitles are to be presented and the corresponding subtitles in the first or second format are retrieved and returned for presentation with the video.

When subtitles for a given video being played or presented are enabled (e.g., a determination is made by the playback control system 124 to automatically present subtitle segments), the subtitles 207 for the given video are accessed and retrieved (e.g., by obtaining a title or identifier of the given video being consumed and searching the subtitles 207 for any subtitles that are linked to the title or identifier of the given video). The subtitles retrieved from subtitles 207 that are linked to the given video being played are then presented together with the given video being played.

Each set of subtitles stored in subtitles 207 for a given video includes a collection or plurality of subtitle segments. The plurality of subtitle segments are sequentially arranged by indices. Namely, the first subtitle segment of subtitle segments presented during playback of a given video may have index 1, the second subtitle segment of subtitle segments that are presented after the first subtitle segment of the given video may have index 2, and so forth. Each subtitle segment also includes a subtitle segment play position specifying the video play positions during which the content of the subtitle segment is rendered for display. For example, the first subtitle segment may have the subtitle segment position including a starting time of 0:15 (minutes:seconds) and an ending time of 0:35 (minutes:seconds). This means that during playback of the video corresponding to the first subtitle segment at a video play position of 0:15, the first subtitle segment is presented starting at video play position 0:15 and ending at video play position 0:35 at which point the subtitle segment is removed. When the video continues playing and reaches the subtitle segment starting time of the next subtitle segment in the sequence (e.g., 1:15), the next subtitle segment in the sequence is presented.

As referred to herein, the next subtitle segment refers to the adjacent subtitle segment that is set to be presented after the subtitle segment corresponding to a current play position. For example, a video may have 10 indices of subtitle segment (e.g., subtitle segments are displayed and then removed 10 times). When the video is at a playback position corresponding to the index 7 of the subtitle segments (e.g., the current video playback position overlaps with the subtitle segment play time of the subtitle segment with index 7) (whether or not the index 7 of subtitle segment are being presented), the next subtitle segment refers to the subtitle segment with index 8.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
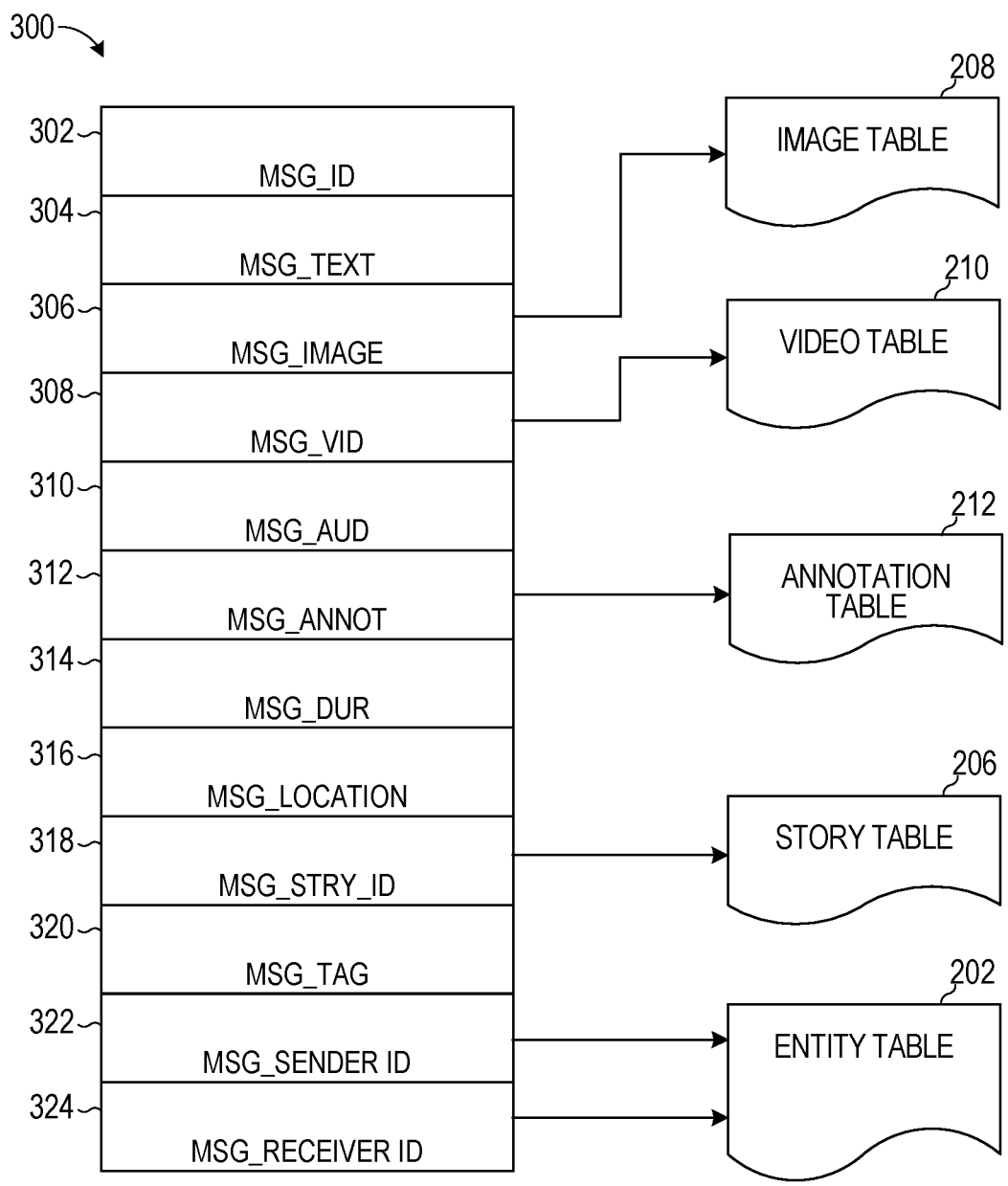
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
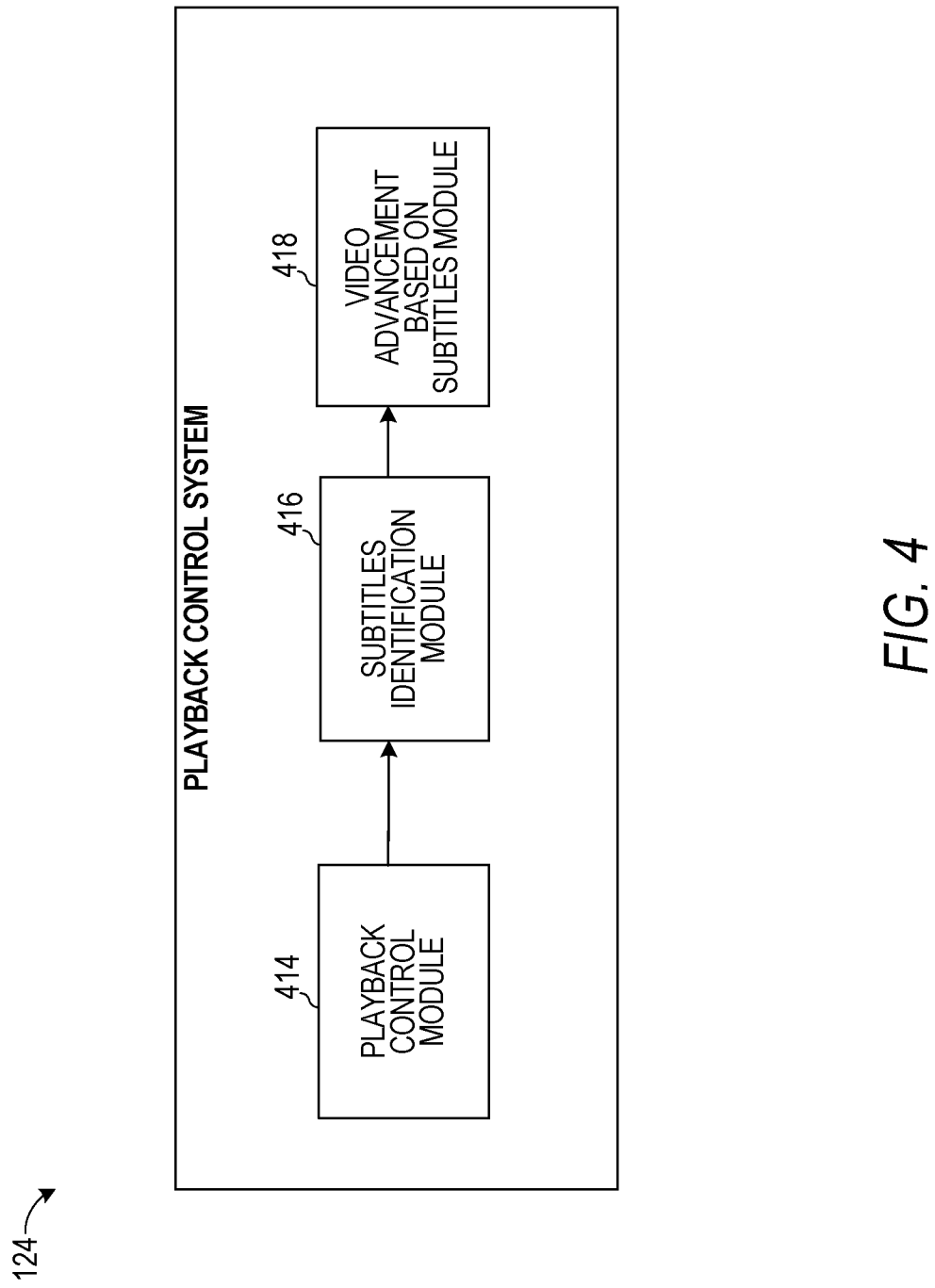
FIG. 4 is a block diagram showing an example playback control system, according to example embodiments.

FIG. 4 is a block diagram showing an example playback control system 124, according to example embodiments. Playback control system 124 includes a playback control module 414, a subtitles identification module 416, and a video advancement based on subtitles module 418. Playback control module 414 monitors user interactions while a video is being played back. For example, playback control module 414 may receive a user selection of a particular video. The playback control module 414 may access the video file of the selected video and begin playing back the selected video. In some cases, the playback control module 414 accesses a subtitles setting to determine whether or not to display subtitles with the video being played back. When the subtitles setting is enabled, the playback control module 414 accesses the subtitles 207 to retrieve the subtitles corresponding to the selected video. In some cases, the playback control module 414 uses an identifier or title of the selected video to find the corresponding set of subtitles to display.

In some embodiments, the playback control module 414 determines the current video play position of the video being played. The playback control module 414 searches the subtitle segment play positions of the retrieved subtitles file to identify a subtitle segment for which the current video play position overlaps the subtitle segment play position. The playback control module 414 determines the index of the subtitle segment that is identified and displays the identified subtitle segment together with and during playback of the video.

In some embodiments, the playback control module 414 detects a user tap on the screen (e.g., the playback control module 414 determines that a user has made physical contact with the screen with their finger for less than a threshold period of time). In response, the playback control module 414 determines whether such an action corresponds to the advance based on subtitle segments feature. For example, the playback control module 414 may access a settings list to determine whether the user has previously configured or if a default setting indicates that tapping on the screen is associated with activation of the advance based on subtitle segments feature.

The playback control module 414 communicates with the subtitles identification module 416 to identify the next subtitle segment corresponding to the video being played back. For example, if the index of the subtitle segment corresponding to the current video play position is 5, then the subtitles identification module 416 retrieves the subtitle segment at index 6 (the next adjacent subtitle segment). The subtitles identification module 416 obtains the subtitle segment position of the retrieved subtitle segment at index 6. For example, the subtitles identification module 416 retrieves the starting time for display of the subtitle segment at index 6. The subtitles identification module 416 communicates the subtitles information for the subtitle segment at index 6 to video advancement based on subtitles module 418.

The video advancement based on subtitles module 418 also receives the current video play position at which the user input tapping on the screen was received. The video advancement based on subtitles module 418 computes a difference between the starting time of the subtitle segment at index 6 and the current video play position. The video advancement based on subtitles module 418 also retrieves a subtitles advancement control threshold. This threshold may be set by a user, may be associated with a type of video being played back, or may be a specified amount (e.g., 10 seconds). The video advancement based on subtitles module 418 compares the computed difference with the subtitles advancement control threshold and adjusts or advances playback based on the comparison.

For example, the video advancement based on subtitles module 418 may determine that the computed difference exceeds the threshold. In such cases, the video advancement based on subtitles module 418 advances playback of the video by a specified amount (e.g., 10 seconds or the value of the threshold). Alternatively, if the computed difference exceeds the threshold, the video advancement based on subtitles module 418 advances playback of the video to the next break or scene in the video or some other video creator designated point. Alternatively, if the computed difference exceeds the threshold, the video advancement based on subtitles module 418 advances playback of the video to the next advertisement.

For example, the video advancement based on subtitles module 418 may determine that the computed difference is less than the threshold. In such cases, the video advancement based on subtitles module 418 advances playback of the video to the subtitle segment starting time of the subtitles at index 6. Playback of the video may resume with or without the subtitle segment at index 6 displayed from the video play position equal to the subtitle segment starting time of the subtitle segment at index 6. Specifically, if the video was being played back at video play position 4:40 (minutes: seconds) and the subtitle segment starting time of the subtitle segment at index 6 is set to 5:10 (minutes:seconds), then the playback of the video may resume with or without the subtitle segment from 5:10 (e.g., playback may automatically jump from 4:40 to 5:10).

Figure 5:
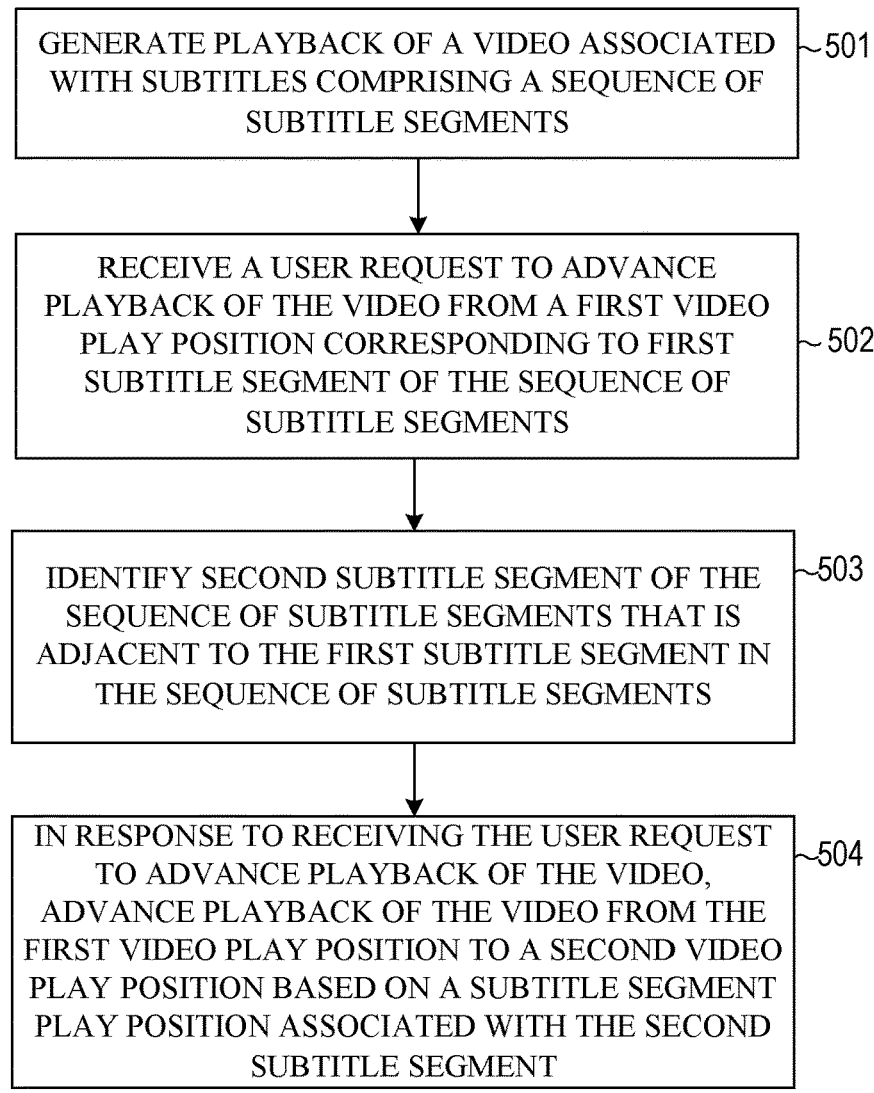
FIG. 5 is a flowchart illustrating example operations of the playback control system, according to example embodiments.

FIG. 5 is a flowchart illustrating example operations of the playback control system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the playback control system 124 generates playback of a video associated with subtitles comprising a sequence of subtitle segments.

At operation 502, the playback control system 124 receives a user request to advance playback of the video from a first video play position corresponding to a first subtitle segment of the sequence of subtitle segments. For example, a user may tap the screen on which the video is being presented to advance playback and skip over some or all of the non-dialogue portion of the video in the video segment being viewed or to view the next subtitle segment in the sequence.

At operation 503, the playback control system 124 identifies a second subtitle segment of the sequence of subtitle segments that is adjacent to the first subtitle segment in the sequence of subtitle segments. For example, the subtitle segment at the next index position in the sequence are identified.

At operation 504, the playback control system 124, in response to receiving the user request to advance playback of the video from the first video play position to a second video play position based on a subtitle segment play position associated with the second subtitle segment. For example, the video advancement based on subtitles module 418 compares a difference (between the subtitle segment play position of the next subtitle segment and the first video play position) with a threshold and adjusts or advances playback based on the comparison.

Figure 6:
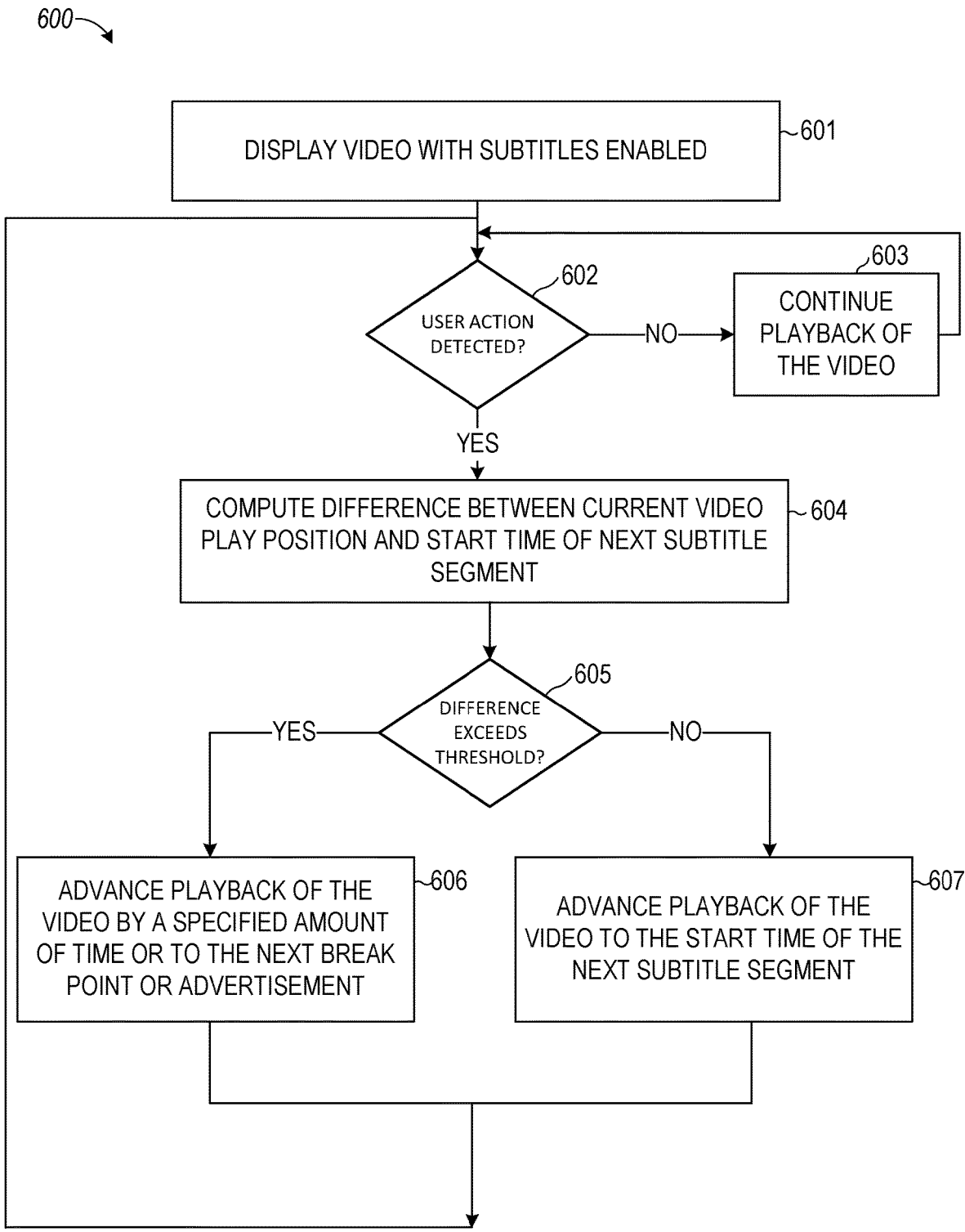
FIG. 6 is a flowchart illustrating example operations of the playback control system, according to example embodiments.

FIG. 6 is a flowchart illustrating example operations of the playback control system 124 in performing process 600, according to example embodiments. The process 600 may be embodied in computer-readable instructions for execution by one or more processors such that the operations of the process 600 may be performed in part or in whole by the functional components of the messaging server system 108 and/or third-party application 105; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the playback control system 124 displays video with subtitles enabled. In some cases, the video may be displayed without subtitles.

At operation 602, the playback control system 124 determines if a user action is detected. If user action is detected, the playback control system 124 proceeds to operation 604, otherwise the playback control system 124 proceeds to operation 603. For example, a gesture of a user may be detected, such as tapping on the screen on which the video is displayed.

At operation 603, the playback control system 124 continues playback of the video.

At operation 604, the playback control system 124 computes a difference between the current video play position and the start time of the next subtitle segment.

At operation 605, the playback control system 124 determines if the difference exceeds a threshold. If the difference exceeds the threshold, the playback control system 124 proceeds to operation 606, otherwise the playback control system 124 proceeds to operation 607.

At operation 606, the playback control system 124 advances playback of the video by a specified amount of time, to the next break point, or to an advertisement.

At operation 607, the playback control system 124 advances playback of the video to the start time of the next subtitle segment.

Figure 7:
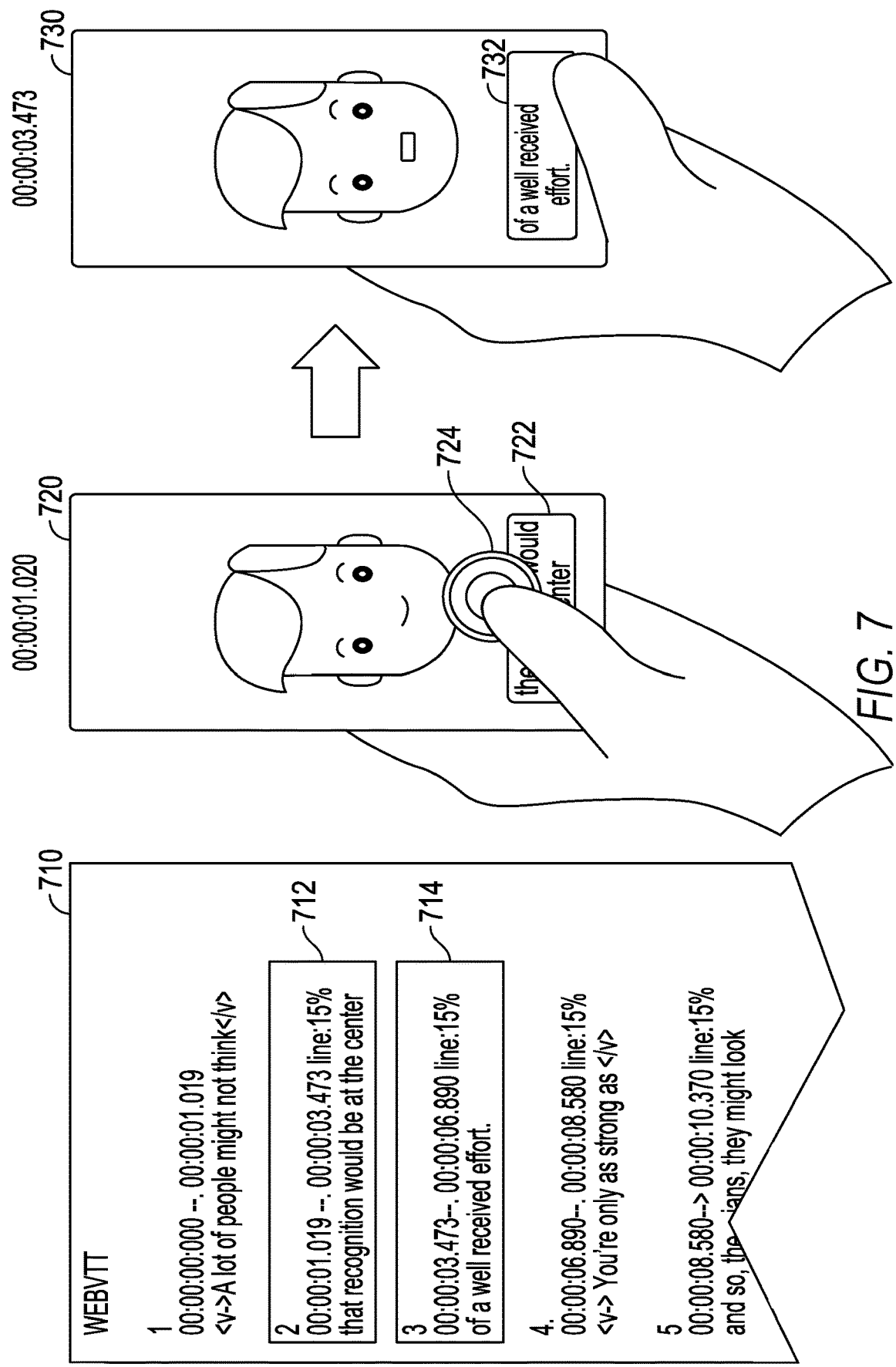
FIG. 7 are illustrative inputs and outputs of the playback control system, according to example embodiments.

FIG. 7 includes illustrative inputs and outputs of the playback control system 124, according to example embodiments. For example, playback control system 124 may present a video 720 to a user on a mobile device. The playback control system 124 may retrieve a subtitles file 710 corresponding to the video being presented. As shown, the subtitles file 710 includes a collection of subtitle segments with indices 1, 2, 3, 4, 5, etc. Each of the subtitle segments includes a subtitle segment play time indicating when the subtitle segment at the index are rendered for display. For example, the subtitle segment 712 at index 2 has a subtitle segment play time with a starting time of 00:00:01.019 (hours:minutes:seconds:milliseconds) and an ending time of 00:00:03.473.

The playback control system 124 may detect a user tap 724 on the screen when the video is being played back at video play position 00:00:01.020 (hours:minutes:seconds: milliseconds). The playback control system 124 may determine that the current video play position 00:00:01.020 overlaps with the subtitle segment 712 at index 2 because this video play position 00:00:01.020 is between the subtitle's starting time and the ending time. As shown, the subtitle segment 712 at index 2 are presented as the displayed subtitle segment 722 together with the video 720.

In response to detecting the user tap 724, the playback control system 124 may retrieve the next subtitle segment 714. Namely, the playback control system 124 may increment the index of the current subtitle segment (e.g., 2) and access the subtitle segment at the next index (e.g., 3). The playback control system 124 retrieves the subtitle segment play time of the subtitle segment 714 at the index 3. Specifically, the playback control system 124 determines that the starting time of the subtitle segment 714 at index 3 is 00:00:03.473. The playback control system 124 may compute a difference between the starting time of the subtitle segment 714 at index 3 and the current video play position. For example, the playback control system 124 computes a difference between 00:00:03.473 (the subtitle segment play time) and 00:00:01.020 (the current video play position).

The playback control system 124 may compare the computed difference with a subtitles threshold (e.g., 10 seconds). The playback control system 124 may determine that the computed difference is less than the threshold. In such cases, the playback control system 124 automatically advances playback of the video 720 to the video play position corresponding to the starting time of the subtitle segment 714 at index 3. Specifically, the playback control system 124 automatically advances playback of the video 720 to resume from 00:00:03.473 (the subtitle segment play time) as shown in screen 730. In some cases, the playback control system 124 also presents the content 732 of the subtitles 714 together with the resumption of the playback from the subtitle segment play time. In some cases, the playback control system 124 may determine that the computed difference exceeds the threshold and, in such circumstances, the playback control system 124 advances playback by a specified amount or to a designed point rather than the subtitle segment play position.

Figure 8:
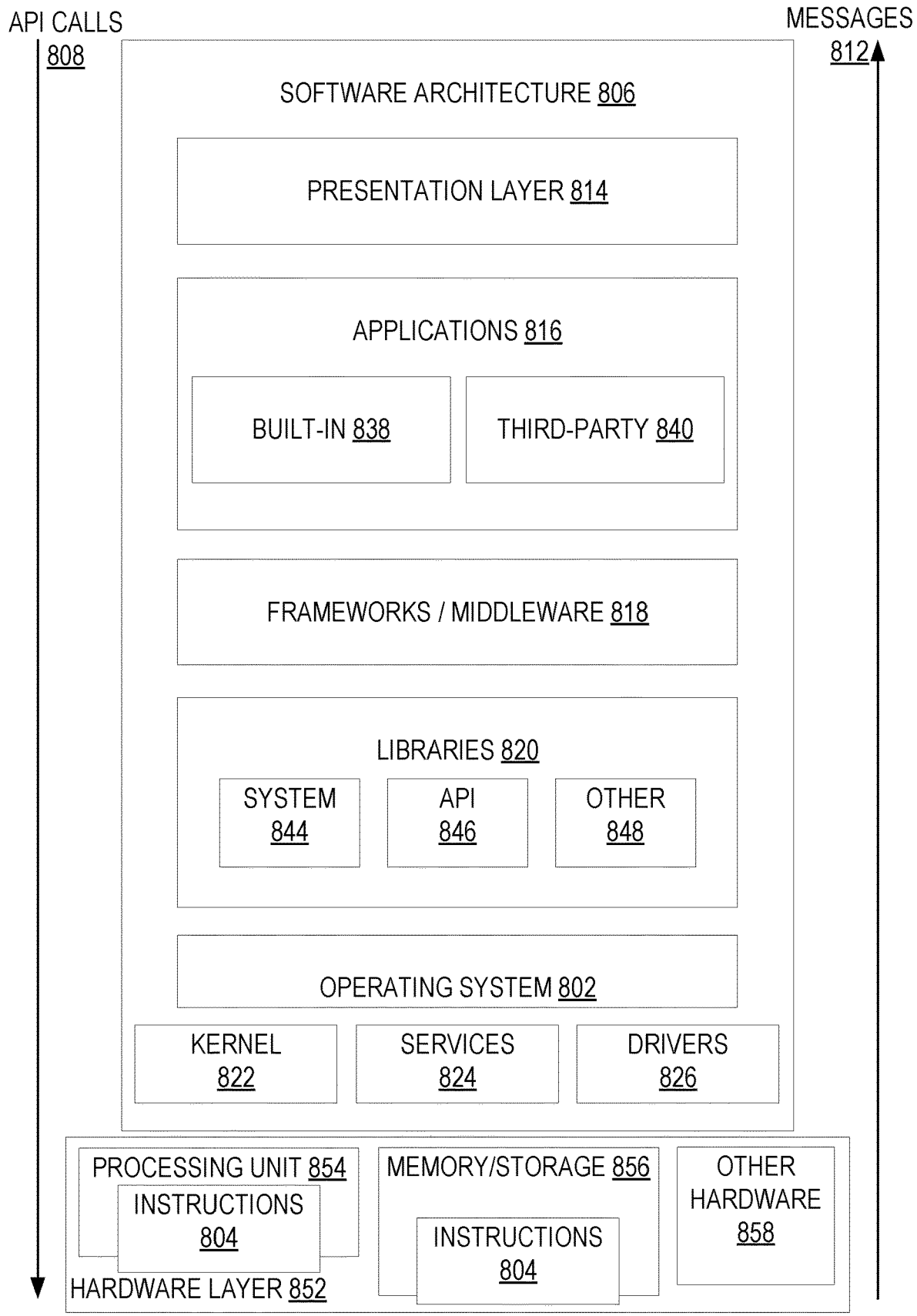
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
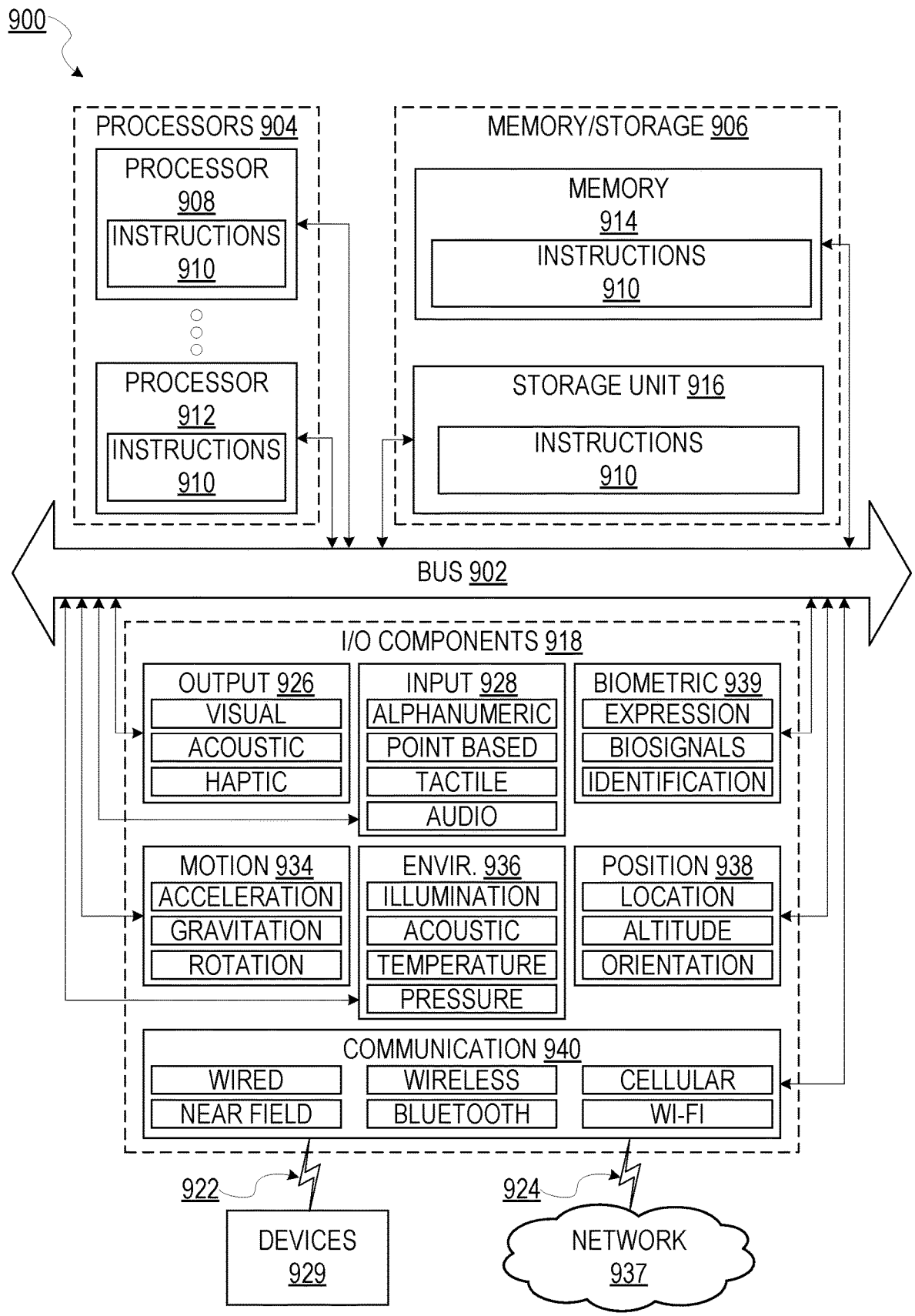
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions 910 contemporaneously. Although FIG. 9 shows multiple processors 904, the machine 900 may include a single processor 908 with a single core, a single processor 908 with multiple cores (e.g., a multi-core processor), multiple processors 908, 912 with a single core, multiple processors 908, 912 with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 937 or devices 929 via coupling 924 and coupling 922, respectively. For example, the communication components 940 may include a network interface component or other suitable device to interface with the network 937. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 929 may be another machine 900 or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting a NFC beacon signal that may indicate a particular location, and so forth.

Glossary:

"CARRIER SIGNAL", in this context, refers to any intangible medium that is capable of storing, encoding, or carrying transitory or non-transitory instructions 910 for execution by the machine 900, and includes digital or analog communications signals or other intangible medium to facilitate communication of such instructions 910. Instructions 910 may be transmitted or received over the network 106 using a transitory or non-transitory transmission medium via a network interface device and using any one of a number of well-known transfer protocols.

"CLIENT DEVICE", in this context, refers to any machine 900 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK", in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE", in this context, refers to a message 300 that is accessible for a time-limited duration. An ephemeral message may be a text, an image, a video 720, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM", in this context, refers to a component, device, or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT", in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 908 or other programmable processor. Once configured by such software, hardware components become specific machines (or specific components of a machine 900) uniquely tailored to perform the configured functions and are no longer general-purpose processors 908. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 908 configured by software to become a special-purpose processor, the general-purpose processor 908 may be configured as respectively different special-purpose processors (e.g., comprising different hardware components) at different times. Software accordingly configures a particular processor 908 or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor 908 or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 106 (e.g., the Internet) and via one or more appropriate interfaces (e.g., an API). The performance of certain of the operations may be distributed among the processors, not only residing within a single machine 900, but deployed across a number of machines. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR", in this context, refers to any circuit or virtual circuit (a physical circuit emulated by logic executing on an actual processor 908) that manipulates data values according to control signals (e.g., "commands," "op codes," "machine code," etc.) and which produces corresponding output signals that are applied to operate a machine 900. A processor 908 may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 908 may further be a multi-core processor having two or more independent processors 904 (sometimes referred to as "cores") that may execute instructions 910 contemporaneously.

"TIMESTAMP", in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
 receiving, by one or more processors, a user request to advance playback of a video file from a first video play position corresponding to a first subtitle segment;
 identifying, by the one or more processors, a second subtitle segment that is adjacent to the first subtitle segment; and
 computing a difference between the first video play position of the video file and a subtitle segment play position of the video file associated with the second subtitle segment; and
 in response to receiving the user request to advance playback of the video file, advancing playback of the video file from the first video play position based on the difference between the first video play position and the subtitle segment play position associated with the second subtitle segment.

2. The method of claim 1, further comprising:
 generating playback of the video file associated with subtitles comprising a sequence of subtitle segments that includes the first subtitle segment; and
 in response to receiving the user request to advance playback of the video file and in response to identifying the second subtitle segment that is adjacent to the first subtitle segment, using the subtitle segment play position associated with the second subtitle segment to advance the playback of the video file from the first video play position to a second video play position.

3. The method of claim 1, further comprising:
 comparing the difference between the first video play position and the subtitle segment play position associated with the second subtitle segment to a threshold.

4. The method of claim 1, further comprising:
 retrieving a sequence subtitle segments of the video file, each of the subtitle segments in the sequence of subtitle segments being associated with an index and a corresponding subtitle segment play position, each subtitle segment play position indicating start and end times for when to render a display of the corresponding subtitle segment.

5. The method of claim 1, further comprising computing a second video play position as a function of the difference between the first video play position and the subtitle segment play position associated with the second subtitle segment.

6. The method of claim 1, further comprising:
 determining that the difference between the first video play position and the subtitle segment play position associated with the second subtitle segment exceeds a threshold; and
 in response to determining that the difference between the first video play position and the subtitle segment play position associated with the second subtitle segment exceeds the threshold, advancing playback of the video file from the first video play position by a specified amount of time.

7. The method of claim 6, wherein the specified amount of time is user defined or has a value equal to the threshold.

8. The method of claim 1, further comprising:
 advancing playback of the video file from the first video play position by a specified amount of time based on an amount of the difference.

9. The method of claim 1, further comprising:
 determining that the difference between the first video play position and the subtitle segment play position associated with the second subtitle segment exceeds a threshold; and
 in response to determining that the difference between the first video play position and the subtitle segment play position associated with the second subtitle segment exceeds the threshold, advancing playback of the video file from the first video play position to a break point adjacent to the first video play position.

10. The method of claim 1, further comprising:
 determining that the difference between the first video play position and the subtitle segment play position associated with the second subtitle segment exceeds a threshold; and
 in response to determining that the difference between the first video play position and the subtitle segment play position associated with the second subtitle segment exceeds the threshold, advancing playback of the video file from the first video play position to an advertisement adjacent to the first video play position.

11. The method of claim 1, further comprising:
 determining that the difference between the first video play position and the subtitle segment play position associated with the second subtitle segment is less than a threshold;
 in response to determining that the difference between the first video play position and the subtitle segment play position associated with the second subtitle segment is less than the threshold, retrieving a start time associated with the subtitle segment play position; and
 advancing playback of the video file from the first video play position to the start time associated with the subtitle segment play position.

12. The method of claim 1, further comprising generating a display of the first subtitle segment together with the video file at the first video play position that is generated for playback.

13. The method of claim 1, further comprising receiving user input that selectively activates an advance by subtitle segments feature.

14. The method of claim 13, further comprising, in response to determining that the advance by subtitle segments features is disabled, advancing playback of the video file in response to the user request from the first video play position to a specified play position.

15. A system comprising:
 a processor configured to perform operations comprising:
 receiving a user request to advance playback of a video file from a first video play position corresponding to a first subtitle segment;
 identifying a second subtitle segment that is adjacent to the first subtitle segment; and computing a difference between the first video play position of the video file and a subtitle segment play position of the video file associated with the second subtitle segment; and in response to receiving the user request to advance playback of the video, advancing playback of the video file from the first video play position based on the difference between the first video play position and the subtitle segment play position associated with the second subtitle segment.

16. The system of claim 15, wherein the operations further comprise:

generating playback of the video file associated with subtitles comprising a sequence of subtitle segments that includes the first subtitle segment; and in response to receiving the user request to advance playback of the video file and in response to identifying the second subtitle segment that is adjacent to the first subtitle segment, using the subtitle segment play position associated with the second subtitle segment to advance the playback of the video file from the first video play position to a second video play position.

17. The system of claim 15, wherein the operations further comprise comparing the difference between the first video play position and the subtitle segment play position associated with the second subtitle segment to a threshold.

18. The system of claim 15, wherein the operations further comprise retrieving a sequence subtitle segments of the video file, each of the subtitle segments in the sequence of subtitle segments being associated with an index and a corresponding subtitle segment play position, each subtitle segment play position indicating start and end times for when to render a display of the corresponding subtitle segment.

19. The system of claim 15, wherein the operations further comprise:

determining that the difference between the first video play position and the subtitle segment play position associated with the second subtitle segment exceeds a threshold; and in response to determining that the difference between the first video play position and the subtitle segment play position associated with the second subtitle segment exceeds the threshold, advancing playback of the video file from the first video play position by a specified amount of time.

20. A non-transitory machine-readable storage medium that includes instructions that, when executed by one or more processors of a machine, cause the machine to perform operations comprising:

receiving a user request to advance playback of a video file from a first video play position corresponding to a first subtitle segment;

identifying a second subtitle segment that is adjacent to the first subtitle segment; and computing a difference between the first video play position of the video file and a subtitle segment play position of the video file associated with the second subtitle segment; and in response to receiving the user request to advance playback of the video, advancing playback of the video file from the first video play position based on the difference between the first video play position and the subtitle segment play position associated with the second subtitle segment.

* * * * *